Figure 1:
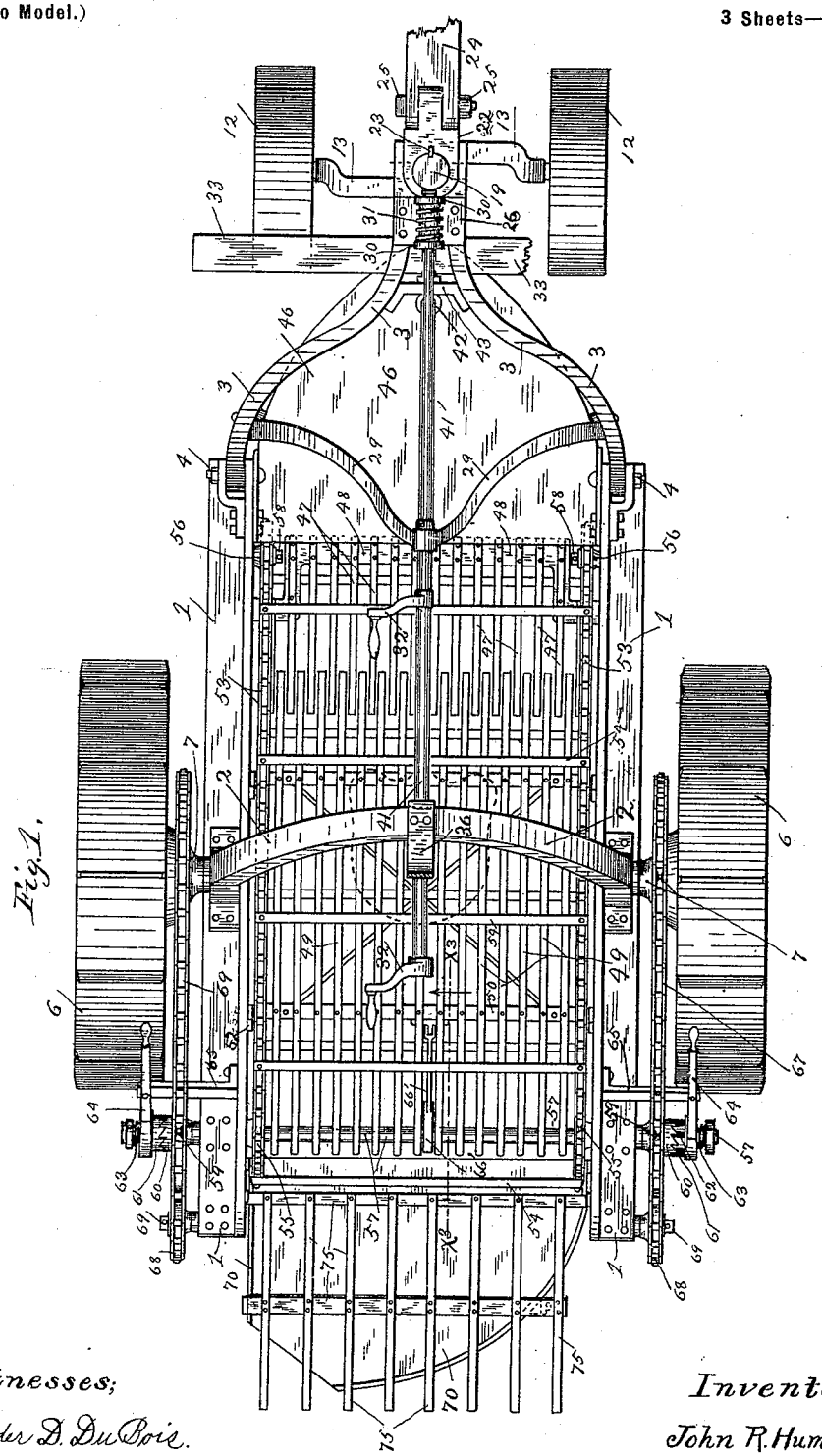

No. 642,696. Patented Feb. 6, 1900.
J. R. HUMPHREY.
POTATO DIGGER.
(Application filed July 26, 1898.)

(No Model.) 3 Sheets—Sheet 1.

Witnesses:
Alexander D. DuBois.
F. D. Merchant

Inventor:
John R. Humphrey
By his Attorney,
Jas. F. Williamson

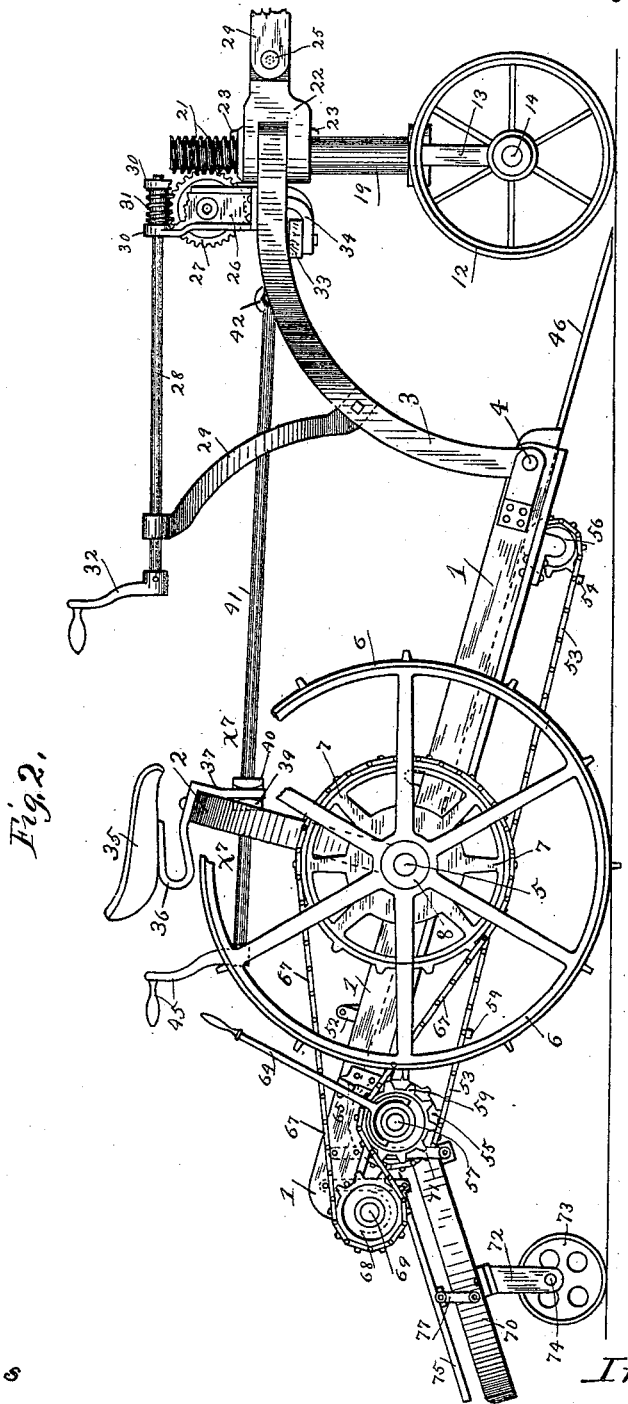

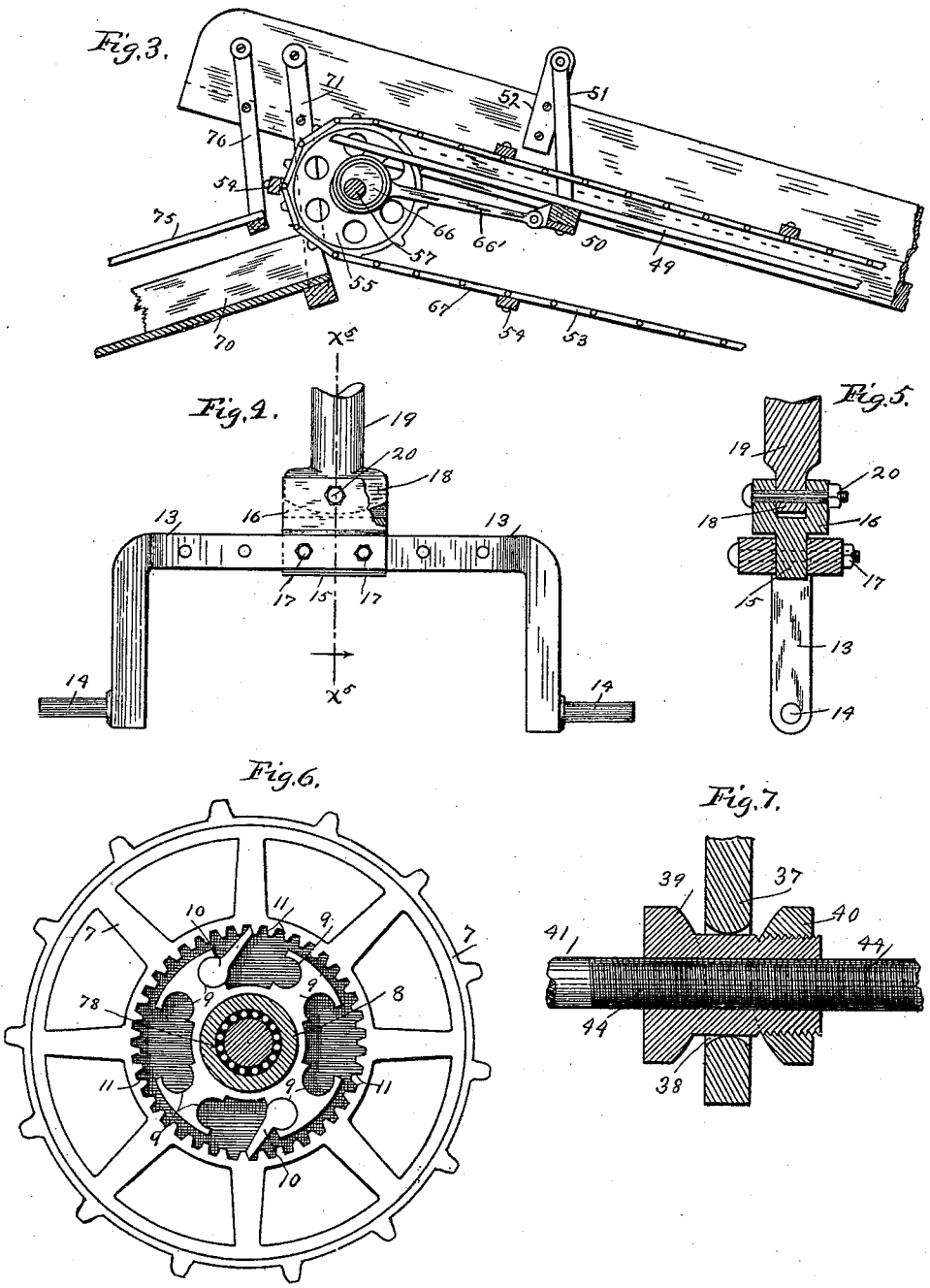

UNITED STATES PATENT OFFICE.

JOHN R. HUMPHREY, OF ELK RIVER, MINNESOTA, ASSIGNOR OF ONE-HALF TO JOHN A. CRANSTON, OF SAME PLACE.

POTATO-DIGGER.

SPECIFICATION forming part of Letters Patent No. 642,696, dated February 6, 1900.

Application filed July 26, 1898. Serial No. 686,902. (No model.)

*To all whom it may concern:*

Be it known that I, JOHN R. HUMPHREY, a citizen of the United States, residing at Elk River, in the county of Sherburne and State of Minnesota, have invented certain new and useful Improvements in Potato-Diggers; and I do hereby declare the following to be a full, clear, and exact description of the invention, such as will enable others skilled in the art to which it appertains to make and use the same.

My invention has for its object to provide an improved potato-digger; and to this end it consists of the various novel devices and combinations of devices hereinafter described, and defined in the claims.

The preferred form of my invention is illustrated in the accompanying drawings, wherein like characters indicate like parts throughout the several views.

Figure 1 is a plan view of the machine. Fig. 2 is a right side elevation of the same with some parts broken away. Fig. 3 is a longitudinal vertical section taken through a portion of the machine on the line $x^3 x^3$ of Fig. 1. Fig. 4 is a detail of the axle of the front truck and its pivotal mounting. Fig. 5 is a vertical section on the line $x^5 x^5$ of Fig. 4. Fig. 6 is a detail of one of the driving-sprockets and the clutch which connects it to the hub of the coöperating traction-wheel, and Fig. 7 is a detail in horizontal section taken on the line $x^7 x^7$ of Fig. 2.

The main frame of the machine comprises a pair of parallel angle-bars 1, the central portions of which are rigidly tied together by a heavy transverse yoke 2 and a pronged and curved yoke or bracket 3, the prongs of which are pivoted to the forward ends of said angle-bar 1, as shown at 4. The ends of the yoke 2 are formed with outturned trunnions 5, on which traction-wheels 6 and driving-sprockets 7 are loosely and independently mounted. The hubs 8 of the traction-wheels 7 are formed with segmental seats 9, that are more than a semicircle in extent and in which the correspondingly-formed hubs of loose driving-pawls 10 are adapted to be loosely mounted. These pawls 10 are gravity-actuated and are normally held in engagement with internal teeth 11, with which the driving-sprockets 7 are provided. The arrangement of the seats 9 and pawls 10 is such that the pawls may be reversed so that they will act in either one of two directions on the teeth 11. This makes it unnecessary to construct the parts in rights and lefts for the right and left sides of the machine.

The front truck comprises a pair of wheels 12, which in diameter are much less than the traction-wheels, and a bent or U-shaped axle 13, provided with outturned trunnions 14, on which said wheels 12 are loosely mounted. As shown, the axle 13 is formed in sections, which sections are rigidly secured to the depending flange 15 of a pronged head 16 by means of a nutted bolt 17. The lower and flattened end 18 of a heavy pivot-bolt or pintle 19 is pivoted between the lugs or ears of the head 16 by means of a nutted bolt 20 or similar device. The upper end of this pivot-bolt or pintle 19 is pivoted in a vertical seat formed in the forward end of the bracket 3, and for a purpose which will presently appear it is formed at this upper end with screw-threads 21. 22 indicates a head or casting provided with prongs which embrace the forward end of the bracket 3 and through which said pivot-bolt or pintle 19 is also passed. However, said pintle or bolt 19 is caused to rotate with the head or casting 22, but is free to move vertically through the same by means of a key 23, carried by said head 22 and working in a vertically-elongated seat in said bolt or stem. The pole 24 is pivotally connected to the head 22, as shown, by means of a nutted bolt 25. The forward truck-wheels 12 run much closer together than the traction-wheels, but are spaced far enough apart to straddle a row of potatoes. Mounted on and between a pair of bearings or castings 26 on the bracket 3 is a screw-gear 27, which is in mesh with the screw-threads 21 of the pintle 19.

28 indicates a rod which is mounted at its rear end in a yoke-like extension 29 from the bracket 3 and at its forward end in lugs 30 of one of the bearings 26. Between the lugs 30 the rod 28 is provided with a worm or screw-threaded section 31, the teeth of which are in mesh with the teeth of the worm-gear 27. At its extreme rear end the rod 28 is provided with a hand-crank 32, by means of which it may be turned at will. 33 indicates the two-horse evener, which, as shown, is pivoted to a bracket 34, that depends from the bracket 3, just to the rear of the pintle 19.

35 indicates the driver's seat, which, as shown, is secured to a spring-support 36, which in turn is rigidly secured to the central portion of the yoke 2 and is provided with a depending end 37. This depending end 37 has a square or angular passage 38, in which the angular hub of a nut-block 39 is fitted. The forwardly-projecting end of the nut-block 39 is screw-threaded and is engaged by a nut 40, which holds it in place. Both the nut 40 and the head of the block 39 are beveled on their inner faces, so that while the nut-block 39 cannot rotate it is free for considerable angular movement in the seat 38.

41 indicates a long tension rod, the forward end of which is swiveled and pivoted, as shown at 42, to a small transverse angle-piece 43, rigidly secured in the crotch of the yoke or bracket 3. The intermediate portion of this tension-rod 41 works through the nut-block 39, being provided with screw-threads 44 for affording a screw-threaded engagement therewith, and at its extreme rear end said tension-rod is provided with a hand-crank 45, by means of which it may be readily turned.

Rigidly connected between the forward ends of the angle-bars and projecting forward in a plane approximately parallel therewith is a flat-pointed shovel or plow 46, which when lowered serves to unearth or dig up the potatoes. The forward point of this shovel or plow-blade 46 works centrally between the rear portions of the forward truck-wheels 12. From the rear portion of said shovel a series of closely-located parallel fingers or slats 47 project rearward. As shown, these fingers or slats 47 are rigidly secured to a transverse supporting-bar 48, which underlies and is spaced apart from the rear edge of said shovel 47.

49 indicates parallel longitudinally-extended slats, and 50 transverse bars, of a vibrating or shaking apron which is mounted to work or vibrate longitudinally of the machine between the angle-bars 1, the same being suspended for such movements by means of pivoted hangers or arms 51, which, as shown, are pivoted at their upper ends to projections 52 from the said angle-bars. It should be noted that the forward ends of the slats 49 work between the rear ends of the slats or fingers 47, so that the material passed over the same cannot possibly clog or stop the vibrations of the vibrating apron. An endless conveyer, consisting of a pair of parallel laterally-spaced link belts or chains 53, tied together by cross-slats 54, works over the faces of the fixed skeleton section formed by the fingers or slats 47 and over the upper face of the vibrating or shaking apron or deck 49 50. The said chains 53 run over sprocket-wheels 55 56, the former of which are fixed on a transverse shaft 57, mounted in suitable bearings secured to the rear ends of the angle-bars 1, and the latter of which are loose on fixed studs 58, projecting inward from the forward ends of said angle-bars 1. It will be noted by reference to Fig. 1 that the transverse bar 48, which supports the fingers 47, is offset at its ends to make room for the sprocket-wheels 56.

The ends of the shaft 57 project outward of the bars 1 and adjacent to said bars are provided with loose sprocket-wheels 59, provided with half-clutches 60. Just outward of these half-clutches 60 the shaft 57 is provided with sliding half-clutches 61, which coöperate with said half-clutches 60. The sliding half-clutches are, as is ordinary, connected to the shaft by means of a groove and feather 62, and they are normally held in engagement with their coöperating half-clutches 60 by springs 63. They are adapted to be thrown out of engagement with said half-clutches by shipper-levers 64, pivoted to supports 65, projecting from the angle-bars 1. Some suitable means should be provided for holding the shipper-lever 64 where set; but it has not been deemed necessary for the purposes of this case to illustrate the same.

At its intermediate portion the shaft 57 is provided with an eccentric or crank 66, on which works a strap or eccentric-rod 66', the forward end of which is pivotally connected to one of the cross-bars 50 of the vibrating or shaking apron 49 50. Hence it is obvious that the movement of the shaft 57 will not only cause the movement of the endless carrier or conveyer, but will also cause longitudinal vibrations of the vibrating apron. Under the advanced movement of the machine the shaft 57 is given its rotary movement in the proper direction from a pair of endless chains 67, which run over the driving-sprockets 7, over the sprockets 59, and over idle or guide sprockets 68, which are loosely mounted on studs 69, projected outward from the extreme rear ends of the angle-bars 1.

Potatoes discharged off from the rear end of the vibrating table 49 50 will fall onto an inclined deck 70, which is so constructed that it will discharge the potatoes in windrows at one side of the machine. The forward portion of this deck 70 is pivotally supported to the depending ends of a pair of hangers 71, that are rigidly secured at their upper ends to the rear ends of the angle-bars 1. At its intermediate portion this deck 70 is provided with a caster-bracket 72, in which an eccentric caster-wheel 73 is pivoted at a point eccentric to its center, as shown at 74. Over the top of this inclined deck 70 is a skeleton frame 75, as shown, formed of slats and cross-bars and at its forward end pivotally supported by a pair of hangers 76, that depend from and are rigidly secured to the rear ends of the angle-bars 1. At its intermediate portion the skeleton frame 75 is pivotally supported from the deck 70 by a pair of short links 77. The slats of the over deck 75 are spaced apart far enough to permit any potatoes which may be thrown thereon to fall through the same and onto the under deck 70.

78 indicates ball-bearings, with which, as shown, the drive-wheels 6 and sprockets 7 are provided.

Operation: The frame-sections 1 and 3 have a toggle-joint movement with respect to each other in the act of raising and lowering the shovel or plow-blade 46, and this movement is readily accomplished by the driver while sitting on the seat 35 simply by turning the tension-rod 41, so as to increase or decrease the distance between the nut-block 39 and the swiveled joint 42. In this manner the shovel or plow-blade may be given such movements as are ordinarily necessary to throw the same low enough to unearth potatoes and to raise the same above the ground when out of use. Additional adjustment may, however, be given to the frame-sections and to the shovel or plow-blade by the manipulation of the hand-crank 32, which, through the intermediate worm-and-gear connections, will move the pivot-bolt or pintle 19 vertically through the pole-casting 22 and forward end of the frame-section 3. This latter-noted adjustment also makes it possible to keep the pintle or pivot-bolt 19 approximately vertical throughout the different adjustments caused by the movements of the hand-crank 45 and tension-rod 41. It will be noted that the screw-threaded upper end 21 of the pintle or pivot-bolt 19, while serving as a rack under the action of the worm-gear 27, permits the free rotation or oscillations of the forward truck, as is necessary when the machine is turned or driven on a curved line. As best shown in Fig. 4, the flattened head 18 of the pintle 19 has considerable clearance at its lower edge, so that the bent axle 13 is free for a limited oscillation in a transverse vertical plane. This permits the wheels of the front truck to adapt themselves to all irregularities in the surface of the ground over which the machine travels. When the machine is thrown into action, the half-clutches 61 are of course engaged with the half-clutches 60, as shown in Fig. 1, thus throwing the endless conveyer 53 54 into action and vibrating the skeleton apron 49 50. The potatoes and dirt raised by the shovel or plow-blade will be crowded upward onto the fixed slats 47, and from thence they will be carried onto and over the vibrating or shaking skeleton apron 49 50. The vibrations of the shaking apron will separate the dirt from the potatoes and cause the dirt to fall through the meshes or openings therein, while the potatoes, not being able to pass through these openings, will be carried over the apron and discharged onto the inclined discharge-deck 70, from whence they will be discharged, at one side of the machine, as previously described. The potato-vines will be thrown onto the skeleton frame or over deck 75 and by the same will be discharged in the path over which the machine has just traveled and to one side of the row of discharged potatoes. The movement of the eccentric wheel 73 will keep the deck 70 and over-deck 75 constantly moving up and down, thus preventing the potatoes from clogging or accumulating on the deck 70 and the vines from accumulating on the over-deck or frame 75. As is obvious, this movement greatly facilitates the discharge of the materials noted.

When the machine is out of use, the shovel or plow-blade 46 is of course raised above the ground, this being accomplished by the means and in the manner above specified. Also, as previously indicated, the endless conveyer and vibrating skeleton apron are rendered idle by separating the coöperating half-clutches 60 61.

Attention is here called to the fact that with the construction above described the conveyer and vibrating platform will not be moved when the machine is run backward, and, furthermore, that both of the traction-wheels 6 are made to serve as drivers having independent actions on the parts driven thereby, so that in turning a curve, for example, the outer wheel being driven the faster of the two will at that time be the driver.

It will of course be understood that various alterations in the specific details of construction above described may be made within the scope of my invention.

What I claim, and desire to secure by Letters Patent of the United States, is as follows:

1. In a potato-digger, the combination with a pair of frame-sections pivotally connected for a toggle-joint action, of truck-wheels supporting each of said sections, an unearthing-shovel fixed to one of said sections, and a tension-rod swiveled to one of said sections and having screw-threaded engagement with a part carried by the other section, substantially as and for the purposes set forth.

2. In a potato-digger, the combination with the parallel side bars 1, tied together by the yoke 2, of the pronged frame-section 3, pivoted to said bars 1, at 4, the nut-block 39 fixed against rotation, but otherwise loosely mounted in the upper portion of the yoke 2, and the tension-rod 41 swiveled to said section 3, having screw-threaded engagement with said nut-block 39 and provided with the hand-crank 45, by means of which it may be turned, substantially as described.

In testimony whereof I affix my signature in presence of two witnesses.

JOHN R. HUMPHREY.

Witnesses:
BESSIE B. NELSON,
F. D. MERCHANT.